(12) United States Patent
Luo

(10) Patent No.: US 11,681,655 B2
(45) Date of Patent: *Jun. 20, 2023

(54) METHOD AND APPARATUS FOR OPENING FILE, AND ELECTRONIC DEVICE

(71) Applicant: GUANGDONG OPPO MOBILE TELECOMMUNICATIONS CORP., LTD., Guangdong (CN)

(72) Inventor: Jieming Luo, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/346,417

(22) Filed: Jun. 14, 2021

(65) Prior Publication Data

US 2021/0303518 A1  Sep. 30, 2021

Related U.S. Application Data

(63) Continuation of application No. 16/174,616, filed on Oct. 30, 2018, now Pat. No. 11,061,863.

(30) Foreign Application Priority Data

Feb. 13, 2018 (CN) .......................... 201810150628.8

(51) Int. Cl.
 *G06F 16/16* (2019.01)
 *G06F 16/11* (2019.01)
 (Continued)

(52) U.S. Cl.
 CPC .......... *G06F 16/168* (2019.01); *G06F 16/116* (2019.01); *G06F 16/148* (2019.01);
 (Continued)

(58) Field of Classification Search
 CPC ...... G06F 16/148; G06F 16/16; G06F 3/0484; G06F 16/116; G06F 16/172;
 (Continued)

(56) References Cited

U.S. PATENT DOCUMENTS

| 5,987,247 | A | * | 11/1999 | Lau | .......................... | G06F 8/24 |
|  |  |  |  |  |  | 717/100 |
| 7,945,850 | B2 | * | 5/2011 | Machalek | ............... | G06F 40/18 |
|  |  |  |  |  |  | 719/315 |

(Continued)

*Primary Examiner* — Kuen S Lu
(74) *Attorney, Agent, or Firm* — Hodgson Russ LLP

(57) ABSTRACT

Embodiments of the present disclosure provide a method and an apparatus for opening a file, and an electronic device. Embodiments of the present disclosure receive the file opening request, obtain the format information of the file to be opened indicated by the file opening request, search for application information of the target application for opening the file to be opened according to the format information, provide the application entry of the target application in the current interface according to the application information, obtain the configuration file corresponding to the target application when the application entry is triggered, and generate the native interface of the target application according to the configuration file and open the file to be opened in the native interface.

20 Claims, 6 Drawing Sheets

(51) Int. Cl.
*G06F 16/14* (2019.01)
*G06F 16/172* (2019.01)
*H04L 67/00* (2022.01)
*H04L 67/06* (2022.01)
G06F 3/04817 (2022.01)
G06F 3/0484 (2022.01)

(52) U.S. Cl.
CPC ............ *G06F 16/16* (2019.01); *G06F 16/162* (2019.01); *G06F 16/172* (2019.01); *H04L 67/06* (2013.01); *H04L 67/34* (2013.01); *G06F 3/0484* (2013.01); *G06F 3/04817* (2013.01)

(58) Field of Classification Search
CPC .. G06F 16/168; G06F 16/162; G06F 3/04817; G06F 16/11; G06F 16/14; H04L 67/34; H04L 67/06; H04L 67/00
USPC .......................................................... 707/755
See application file for complete search history.

(56) References Cited

U.S. PATENT DOCUMENTS

| | | | |
|---|---|---|---|
| 2011/0001999 A1* | 1/2011 | Nanaumi | H04N 1/4433 358/1.14 |
| 2013/0219345 A1* | 8/2013 | Saukko | H04M 1/724 715/863 |
| 2015/0199196 A1* | 7/2015 | Cairns | G06F 9/44505 717/120 |
| 2015/0222604 A1* | 8/2015 | Ylonen | H04L 9/3263 713/171 |
| 2016/0294919 A1* | 10/2016 | Pavlov | H04L 67/06 |

\* cited by examiner

METHOD AND APPARATUS FOR OPENING FILE, AND ELECTRONIC DEVICE

CROSS-REFERENCE TO RELATED APPLICATIONS

This application is a continuation of a U.S. application Ser. No. 16/174,616, filed Oct. 30, 2018, which claims priority to Chinese Application No. 201810150628.8, filed Feb. 13, 2018, the entire disclosures of which are incorporated herein by reference.

FIELD

The present disclosure relates to the field of electronic device technologies, and more particularly to a method and an apparatus for opening a file, a storage medium and an electronic device.

BACKGROUND

During using an electronic device, a user may encounter some files with unknown formats. However, the user usually installs some applications for opening files with common formats in the electronic device, which results in that the user does not know how to open the file with the unknown format in the electronic device when he encounters the file with the unknown format.

DISCLOSURE

Embodiments of the present disclosure provide a method and an apparatus for opening a file, a storage medium and an electronic device, which may reduce a difficulty of opening a file.

Embodiments of the present disclosure provide a method for opening a file. The method includes: obtaining format information of a file based on a file opening request; searching for application information for a target application based on the format information; providing an application entry of the target application based on the application information; obtaining a configuration file corresponding to the target application based on triggering the application entry; generating a native interface of the target application based on the configuration file; uploading the file to a remote application server, and instructing the remote application server to open the file and return file content; receiving the file content returned by the remote application server; and displaying the file content in the native interface without installing the target application locally.

Embodiments of the present disclosure provide a storage medium. The storage medium is stored thereon with computer programs that, when running on a computer, cause the computer to implement the method for opening a file provided by any embodiment of the present disclosure.

Embodiments of the present disclosure provide an electronic device. The electronic device includes a memory and a processor. The memory has computer programs. The processor is configured to implement the method for opening a file provided by any embodiment of the present disclosure by calling the computer programs.

BRIEF DESCRIPTION OF THE DRAWINGS

In order to more clearly explain technical solutions in embodiments of the present disclosure or in the related art, drawings required to be used in description of embodiments of the present disclosure or of the related art is simply introduced below. Apparently, the drawings in the following description are merely embodiments of the present disclosure. For the ordinary skilled in the art, other drawings may be obtained based on these drawings without any creative work.

EMBODIMENTS OF THE PRESENT DISCLOSURE

Figure 1:
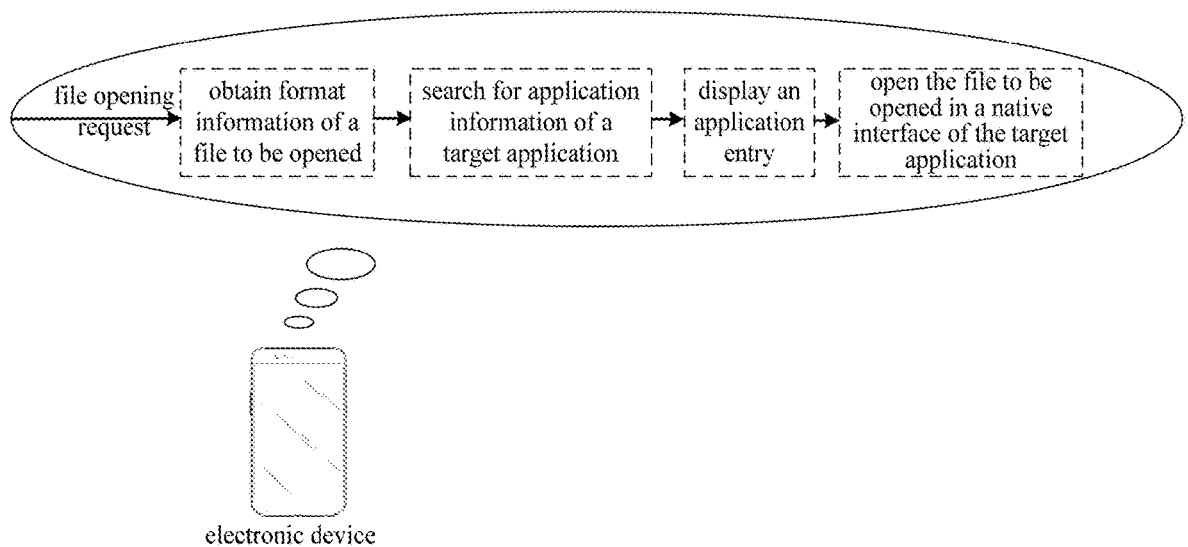
FIG. 1 is a schematic diagram of an application scenario where a method for opening a file according to embodiments of the present disclosure is applied.

Please refer to drawings, in which same reference numbers refer to same components. The principle of the present disclosure is illustrated through implementation in a suitable computing environment. The following description is based on specific embodiments of the present disclosure, which should not be interpreted as limitation to other specific embodiments of the present disclosure that are not described in detail here.

In the following description, specific embodiments of the present disclosure will be illustrated with reference to steps and symbols executed by one or more computers, unless otherwise stated. Thus, these steps and operations will be mentioned several times as being executed by the computer. In the present disclosure, being executed by the computer includes operations of a computer processor unit representing data in a structured form. The operations convert the data or maintain the data at a place in a memory system of the computer, which may be re-configured or change the operation of the computer in a way well known by testers in the art. The data structure maintained by the data is the physical position of the memory, which has specific characteristics defined by the data format. However, the principle of the present disclosure is illustrated in above words, which do not represent a limitation. Testers in the art would appreciate that, following blocks and operations may also be implemented in hardware.

The term "module" used in the present disclosure may be regarded as software object executed on the operating system. Different components, modules, engines and services described herein may be regarded as implementation objects on the operating system. Moreover, the apparatus and method described herein may be implemented in a form of software, or may be implemented on hardware, both of which are in the protection scope of the present disclosure.

Terms such as "first", "second" and "third" used in the present disclosure are used to distinguish different objects, but are not used to describe particular order. Furthermore, terms "including" and "having" and their any variants intend to cover non-exclusive inclusion. For example, a process, a method, a system, a product or a device including a series of steps or modules is not limited to listed steps or modules, instead further includes steps or modules that are not listed in some embodiments, or further includes other steps or modules inherent to the process, the method, the product or the device.

"Embodiment" mentioned herein means that, particular features, structures or characteristics described in combination with the embodiment may be included in at least one embodiment of the present disclosure. This phase appeared at other places in the specification does not refer to the same embodiment, and is not exclusively dependent or alternative embodiment of other embodiments. Those skilled in the art explicitly or implicitly understand that, the embodiment described herein may be combined with other embodiments.

Embodiments of the present disclosure provide a method for opening a file. An execution body of the method may be an apparatus for opening a file provided by embodiments of the present disclosure, or an electronic device having the apparatus for opening the file, in which the apparatus for opening the file may be implemented by hardware or software. The electronic device may be a smart phone, a tablet computer, a handheld computer, a notebook computer, a desktop computer, or other computer device.

Please refer to FIG. 1, which is a schematic diagram illustrating an application scenario where a method for opening a file provided by embodiments of the present disclosure is applied. For example, the apparatus for opening the file is integrated in the electronic device. The electronic device may receive a file opening request, obtain format information of the file to be opened indicated by the file opening request, search for application information of a target application for opening the file to be opened according to the format information, provide an application entry of the target application in a current interface according to the application information, obtain a configuration file corresponding to the target application when the application entry is triggered, and generate a native interface of the target application according to the configuration file and open the file to be opened in the native interface.

In detail, referring to FIG. 1, the file to be opened is for example a file with an unknown format encountered by a user. A request for opening the file with the unknown format triggered by the user may be received (for example, the user may trigger the request for opening the file with the unknown format by clicking a file icon of the file with the known format), and when the request for opening the file with the known format is received, the format information of the file with the unknown format is obtained (the format information is configured to describe a file format of the file with the unknown format, for example, the format information includes an extension of the file with the unknown format). Then, application information of a target application for opening the file to be opened is searched for according to the obtained format information. An application entry of the target application is provided in a current interface according to the found application information (the target application is an application which is not installed currently). For example, the application entry of the target application may be superimposed on the file icon of the file with the unknown format. When the application entry is triggered by the user, a configuration file of the target application is further obtained. Finally, a native interface of the target application is generated according to the obtained configuration file, and the file with the unknown format is opened in the generated native interface. The native interface may be colloquially referred to as "fast application", such that even if the target application is not installed, the target application can run.

Figure 2:
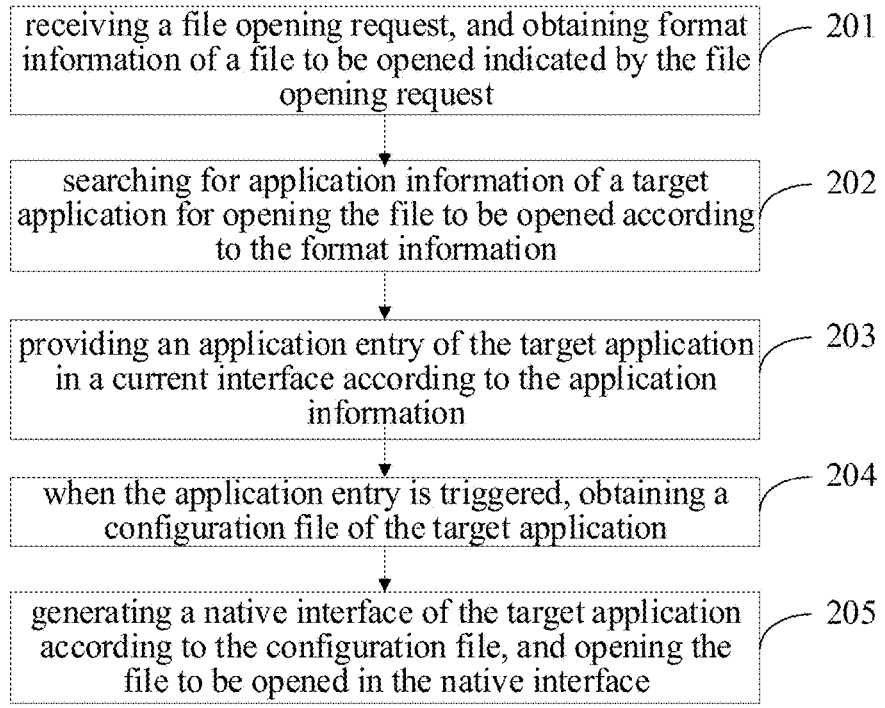
FIG. 2 is a flow chart of a method for opening a file according to an embodiment of the present disclosure.

Please refer to FIG. 2, which is a flow chart of a method for opening a file according to an embodiment of the present disclosure. The method for opening a file according to an embodiment of the present disclosure may include following operations.

At block 201, a file opening request is received, and format information of a file to be opened indicated by the file opening request is obtained.

In embodiments of the present disclosure, the file opening request triggered by the user may be received, and when the file opening request triggered by the user is received, format information of the file to be opened indicated by the file opening request is obtained. The user may trigger the file opening request in various ways based on actual demand.

Figure 3:
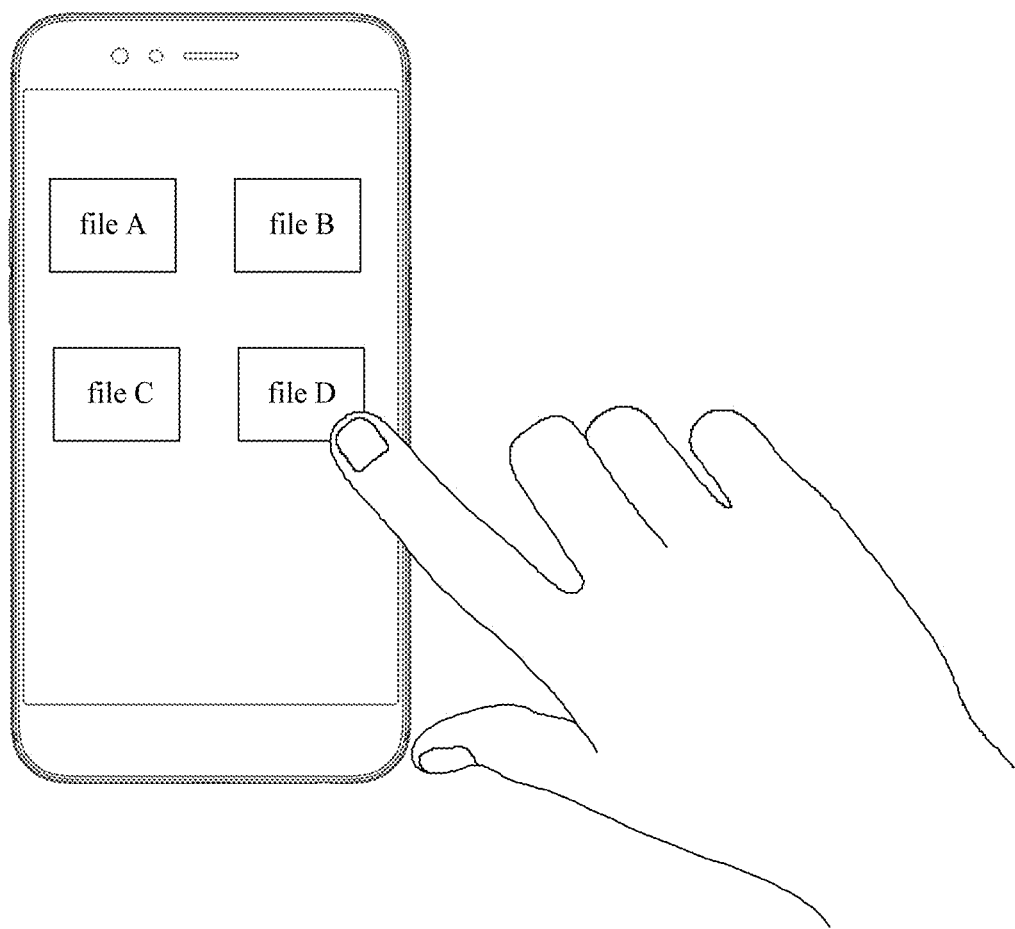
FIG. 3 is a schematic diagram illustrating an operation of a user triggering a file opening request according to an embodiment of the present disclosure.

For example, as illustrated in FIG. 3, file icons of four files (file A, file B, file C, and file D) are displayed in a current interface of the electronic device. On one hand, when the user is interested in file content of file D, he may click the file icon of file D with his finger, to trigger the file opening request, which indicates that file D is the file to be opened. On the other hand, when the electronic device receives the triggered file opening request, the electronic device obtains the format information of the file to be opened indicated by the file opening request, i.e., the format information of file D.

As another example, the user may connect a mouse with the electronic device, operate the electronic device via the mouse to select the file icon corresponding to the file of interest, and trigger the file opening request by double clicking the left button on the mouse. The file to be opened indicated by the file opening request is the file corresponding to the file icon selected by the mouse, i.e., the file in which the user is interested now.

As another example, the user may also trigger the file opening request by inputting a command-line command, which will not be elaborated here.

It is to be noted that, in embodiments of the present disclosure, the format information obtained is configured to describe the file format of the file to be opened. For example, an extension of the file to be opened may be taken as the format information.

In detail, obtaining the format information of the file to be opened indicated by the file opening request includes: obtaining storage path information of the file to be opened; and parsing the storage path information to extract the format information of the file to be opened from the storage path information.

The format information is the extension, in which the extension is typically configured to distinguish file formats of different files. For example, common extensions of picture files include, but not limited to, .gif, .bmp and .jpeg, common extensions of video files include, but not limited to, .avi, .mp4 and .mkv, and common extensions of text files include, but not limited to, .txt, .pdf, and .doc.

It is to be noted that, the extension typically exists as a suffix of the file, and when obtaining the extension of the file to be opened, the storage path information of the file to be opened may be obtained first. In detail, in order to clearly indicate the file to opened, the file opening request further carries the storage path information of the file to be opened.

Thus, the storage path information of the file to be opened may be extracted directly from the file opening request received. After obtaining the storage path information of the file to be opened, the storage path information may be parsed, to extract the extension of the file to be opened.

For example, the obtained storage path information of the file to be opened is "C:\Users\DELL3\Desktop\XX.doc". It can be seen from the storage path information that, the file to be opened is file XX, which is saved on the operating system desktop, and the suffix part ".doc" of the storage path information is directly extracted as the extension of file XX.

At block 202, application information of a target application for opening the file to be opened is searched for according to the format information.

It is to be noted that, different types of files need to be opened by corresponding applications. For example, pdf files need to be opened by a PDF reader application.

In detail, searching for application information of the target application for opening the file to be opened according to the format information may include: sending an application search request carrying the format information to an application server, in which the application search request is configured to instruct the application server to search for the application information of the target application; and receiving the application information of the target application returned by the application server.

The application server serves as a "intermediary" between the user and the developer, and provides platform services for the user and the developer. On one hand, the developer may upload the "fast application" developed by his own to the application server, in which the "fast application" is provided to the user for use via a "fast application platform". On the other hand, the user may find the fast application required for use via the "fast application plat form", based on his demand.

In embodiments of the present disclosure, searching for the application of the target application for opening the file to be opened is a procedure of searching for the fast application required for use.

In an alternative implementation, the application server stores and maintains an association relationship between applications and file formats, in which the association relationship is configured to describe which type of file can be opened by which application or applications. When searching for the application information of the target application for opening the file to be opened, on one hand, the electronic device first builds the application search request according to a preset message format, the application search request at least including the format information of the file to be opened, and then sends the built application search request to the application server to instruct the application server to search for the application information of the target application which can open the file to be opened, and receives the application information of the target application returned by the application server; and on the other hand, after receiving the application search request sent by the electronic device, the application server finds the application information of the target application which can open the file to be opened (the application information is configured to describe the target application) according to the stored association relationship between applications and file formats and the format information of the file to be opened parsed from the application search request (the format information is configured to describe the file format of the file to be opened, for example, is the extension), and then returns the found application information of the target application to the electronic device.

The application information may be an application identification of the target application. The application identification is a character or a character string which can be mapped to the target application. For example, the application identification may be an application name of the target application, a part of the application name, or other terms associated with the target application, etc.

For example, when the application server finds according to the application search request that the target application for opening the file to be opened is a certain PDF reader application, the application server returns the application name "reader XX" of the PDF reader application as the application information of the target application.

In another alternative implementation, the application server does not store and maintain the association relationship between applications and file formats. When searching for the application information of the target application for opening the file to be opened, on one hand, the electronic device first builds the application search request according to a preset message format, the application search request at least including the application information of the file to be opened, and then sends the built application search request to the application server to instruct the application server to search for the application information of the target application which can open the file to be opened, and receives the application information of the target application returned by the application server; and on the other hand, after receiving the application search request sent by the electronic device, the application server parses the application information carried by the application search request, builds a second application search request according to the application information, sends the built second application search request to a search server to instruct the search server to search for the application information of the target application which can open the file to be opened, and returns the application information of the target application to the electronic device after receiving the application information of the target application which can open the file to be opened returned by the search server.

It is to be noted that, in addition to being associated with the target application, the application information is also associated with the fast application corresponding to the target application. For example, the target application is a reader application A, and the application information "XX" is associated with both the reader application A and the fast application A corresponding to the reader application A.

In an embodiment, before searching for the application information of the target application for opening the file to be opened according to the obtained format information, it may be determined whether a default application associated with the obtained format information has been installed. When there is no installed default application associated with the format information, the application information of the target application for opening the file to be opened is searched for according to the format information.

In embodiments of the present disclosure, the electronic device stores and maintains an association relationship between file formats and default applications for opening different file formats. Determining whether a default application associated with the obtained format information has been installed may be performed according to the association relationship. When there is no installed default application associated with the format information, it indicates that the electronic device cannot open the file to be opened with currently installed applications, and thus the application information of the target application for opening the file to be opened may be further searched for according to the format information, the description of which may refer to the above, which is not elaborated here.

At block 203, an application entry of the target application is provided in a current interface according to the application information.

Different display forms of application entries may be provided according to different target applications. It is to be noted that, in embodiments of the present disclosure, the display form of the application entry is not limited, which may adopt the form of "widget", or the form of "shortcut".

Figure 4:
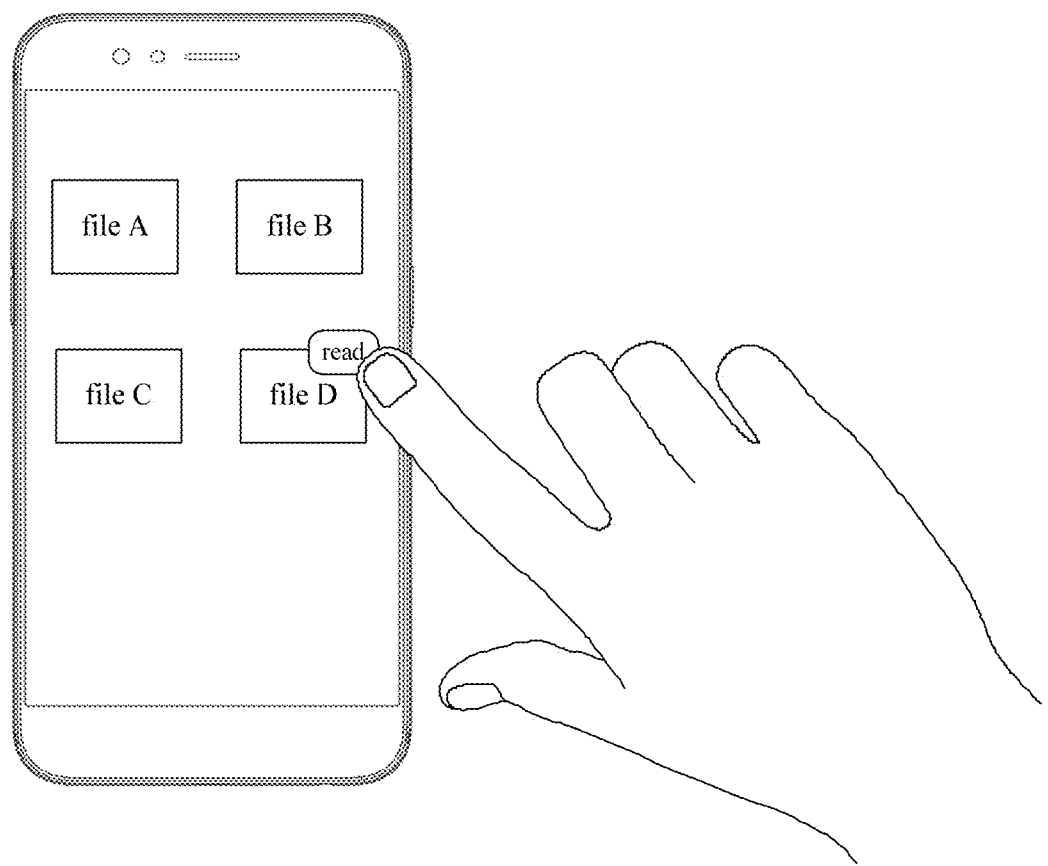
FIG. 4 is a schematic diagram illustrating an operation of a user triggering an application entry according to an embodiment of the present disclosure.

For example, as illustrated in FIG. 4, file D is the file to be opened, the obtained application information describes that the target application is a reader application, the application entry of the reader application may be provided in the form of widget "read" and superimposed on the file icon of file D, and the user may click the displayed widget "read" with the finger to trigger the application entry.

At block 204, when the application entry of the target application is triggered, a configuration file corresponding to the target application is obtained.

In an alternative implementation, obtaining the configuration file corresponding to the target application includes: when the application entry is triggered, sending a configuration file obtaining request carrying the application information to the application server, in which the configuration file obtaining request is configured to instruct the application server to return the configuration file corresponding to the target application; and receiving the configuration file corresponding to the target application returned by the application server.

The configuration file corresponding to the target application is the configuration file of the fast application corresponding to the target application. The configuration file is provided for the electronic device to generate and display a native interface of the target application, such that even if the application has not been installed, the electronic device may achieve an operation effect same as if the target application has been installed.

In detail, the configuration file includes a statement describing an interface of the target application. The statement includes data required for displaying the interface and run logic of the interface.

Such data may include display elements required to be displayed in the interface of the target application, layout information of the display elements, and resource addresses required for displaying the display elements, and the like. The layout information may include information such as positions, sizes and colors of respective display elements. The resource addresses may be addresses of local resources of the electronic device or link addresses of resources stored in the application server.

The foregoing run logic may include interface addresses jumped to when clicking the display elements, or operations required to execute for clicking the display elements, or operations required to execute for other user operations.

It is to be noted that, the foregoing data and run logic may be implemented based on JavaScript language.

In another alternative implementation, before obtaining the configuration file corresponding to the target application when the application entry of the target application is triggered, following operations may be performed:

sending the configuration file obtaining request carrying the application information to the application server, the configuration file obtaining request being configured to instruct the application server to return the configuration file corresponding to the target application; and caching the configuration file corresponding to the target application returned by the application server.

Obtaining the configuration file corresponding to the target application when the application entry of the target application is triggered includes: obtaining the cached configuration file when the application entry of the target application is triggered.

The configuration file obtaining request carrying the application information of the target application may be first sent to the application server, in which the configuration file obtaining request is configured to instruct the application server to return the configuration file corresponding to the target application.

Then, the configuration file corresponding to the target application returned by the application server is received, and the received configuration file is cached into a preset cache region. It is to be noted that, in embodiments of the present disclosure, the size and the path of the cache region is not limited, and may be set by those skilled in the art based on actual demand.

Then, since the configuration file corresponding to the target application has been cached in the local cache region, the configuration file corresponding to the target application can be obtained from the cache region when the application entry of the target application is triggered.

At block 205, the native interface of the target application is generated according to the configuration file, and the file to be opened is opened in the native interface.

The electronic device calls the framework file built in the operating system according to the configuration file corresponding to the target application (i.e., the configuration file of the fast application corresponding to the target application), to parse the foregoing statement. The framework file would parse the statement in the configuration file into display elements, convert the parsed display elements into a native view of the target application according to a correspondence relationship between the display elements and the native view of the target application provided in the framework file, and perform local rendering according to the converted native view, to generate the interface of the fast application corresponding to the target application, i.e., the native interface of the target application.

Then, the file to be opened may be opened in the native interface of the target application. In detail, in an alternative implement, opening the file to be opened in the native interface of the target application includes: uploading the file to be opened to the application server, to instruct the application server to return file content obtained by opening the file to be opened; receiving the file content returned by the application server; and displaying the received file content in the native interface.

The electronic device does not actually undertake the task of opening the file to be opened, but is merely responsible for generating the native interface of the target application and displaying the file content of the file to be opened. In detail, on one hand, the electronic device uploads the file to be opened to the application server, and waits to receive the file content returned by the application server, which is obtained by opening the file to be opened; on the other hand, after receiving the file to be opened uploaded by the electronic device, the application server parses the file to be opened with the file parsing service of the target application, and returns the parsed file content to the electronic device.

In another alternative implementation, opening the file to be opened in the native interface of the target application includes: enabling the file parsing service of the target application according to the configuration file corresponding to the target application; parsing the file to be opened with the file parsing service to obtain the file content of the file to be opened; and displaying the file content in the native interface.

The difference from the forgoing implementation lies in that, the electronic device undertakes the task of opening the file to be opened in addition to undertaking the task of generating the native interface of the target application. In detail, the configuration file further includes a code file for running the file parsing service of the target application. With the file parsing service, the file to be opened may be parsed to obtain the file content of the file to be opened. While the native interface of the target application is generated, the code file corresponding to the file parsing service in the configuration file is executed, to enable the file parsing service of the target application, such that the file to be opened is parsed with the file parsing service to obtain the file content of the file to be opened. Finally, the parsed file content is displayed in the native interface of the target application. Thus, the operation of "opening" the file to be opened is completed.

In embodiments of the present disclosure, after opening the file to be opened in the native interface, the cached configuration file is deleted when the native interface is closed.

In embodiments of the present disclosure, the electronic device further detects a state of the native interface in real time, and deletes the cached configuration file when detecting that the native interface is closed, thus releasing the storage resource occupied by the configuration file.

For example, after viewing the file content via the native interface of the target application, the user may operate the electronic device to close the native interface of the target application. Accordingly, when the electronic device identifies that the native interface of the target application is closed, the electronic device deletes the configuration file of the target application cached in the cache region.

In conclusion, embodiments of the present disclosure receive the file opening request, obtain the format information of the file to be opened indicated by the file opening request, search for application information of the target application for opening the file to be opened according to the format information, provide the application entry of the target application in the current interface according to the application information, obtain the configuration file corresponding to the target application when the application entry is triggered, and generate the native interface of the target application according to the configuration file and open the file to be opened in the native interface. With the technical solutions of the present disclosure, the file to be opened can be opened quickly. Even if the file to be opened has an unknown format, it is not necessary to download and install an additional application, which reduces the difficulty of opening the file.

Figure 5:
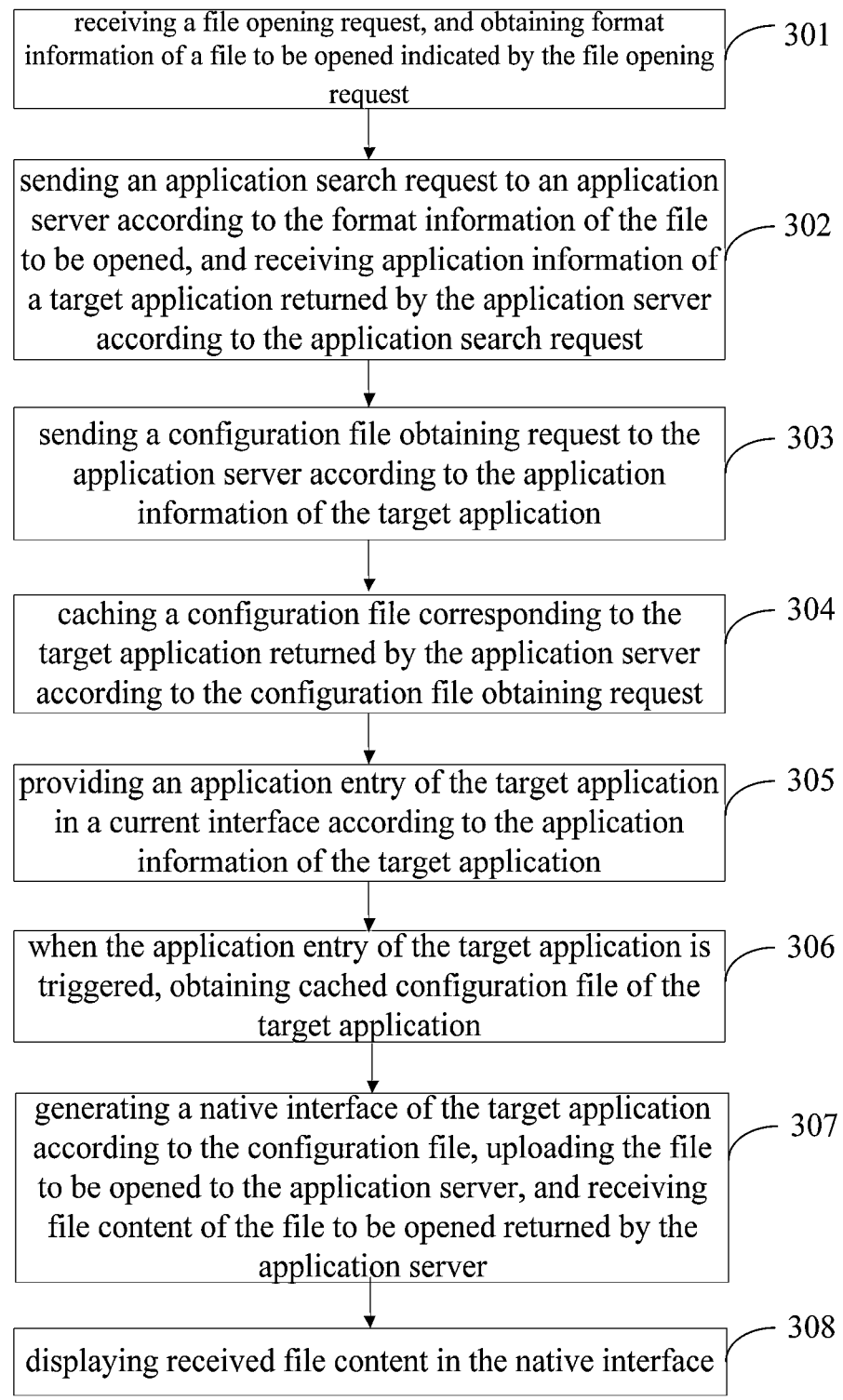
FIG. 5 is a flow chart of a method for opening a file according to another embodiment of the present disclosure.

In the following, the method for opening the file of the present disclosure will be further illustrated based on above embodiments. In detail, referring to FIG. 5, the method for opening the file may include followings.

At block 301, a file opening request is received, and format information of a file to be opened indicated by the file opening request is obtained.

In embodiments of the present disclosure, the file opening request triggered by the user may be received, and when the file opening request triggered by the user is received, format information of the file to be opened indicated by the file opening request is obtained. The user may trigger the file opening request in various ways based on actual demand.

For example, as illustrated in FIG. 3, file icons of four files (file A, file B, file C, and file D) are displayed in a current interface of the electronic device. On one hand, when the user is interested in file content of file D, he may click the file icon of file D with his finger, to trigger the file opening request, which indicates that file D is the file to be opened. On the other hand, when the electronic device receives the triggered file opening request, the electronic device obtains the format information of the file to be opened indicated by the file opening request, i.e., the format information of file D.

As another example, the user may connect a mouse with the electronic device, operate the electronic device via the mouse to select the file icon corresponding to the file of interest, and trigger the file opening request by double clicking the left button on the mouse. The file to be opened indicated by the file opening request is the file corresponding to the file icon selected by the mouse, i.e., the file in which the user is interested now.

As another example, the user may also trigger the file opening request by inputting a command-line command, which will not be elaborated here.

It is to be noted that, in embodiments of the present disclosure, the format information obtained is configured to describe the file format of the file to be opened. For example, an extension of the file to be opened may be taken as the format information.

In detail, obtaining the format information of the file to be opened indicated by the file opening request includes: obtaining storage path information of the file to be opened; and parsing the storage path information to extract the format information of the file to be opened from the storage path information.

The format information is the extension, in which the extension is typically configured to distinguish file formats of different files. For example, common extensions of picture files include, but not limited to, .gif, .bmp and .jpeg, common extensions of video files include, but not limited to, .avi, .mp4 and .mkv, and common extensions of text files include, but not limited to, .txt, .pdf, and .doc.

It is to be noted that, the extension typically exists as a suffix of the file, and when obtaining the extension of the file to be opened, the storage path information of the file to be opened may be obtained first. In detail, in order to clearly indicate the file to opened, the file opening request further carries the storage path information of the file to be opened. Thus, the storage path information of the file to be opened may be extracted directly from the file opening request received. After obtaining the storage path information of the file to be opened, the storage path information may be parsed, to extract the extension of the file to be opened.

For example, the obtained storage path information of the file to be opened is "C:\Users\DELL3\Desktop\XX.doc". It can be seen from the storage path information that, the file to be opened is file XX, which is saved on the operating system desktop, and the suffix part ".doc" of the storage path information is directly extracted as the extension of file XX.

At block 302, an application search request is sent to an application server according to the format information of the file to be opened, and application information of a target application returned by the application server according to the application search request is received, in which the target application is the application for opening the file to be opened.

The application server serves as a "intermediary" between the user and the developer, and provides platform services for the user and the developer. On one hand, the developer may upload the "fast application" developed by his own to the application server, in which the "fast application" is provided to the user for use via a "fast application platform". On the other hand, the user may find the fast application required for use via the "fast application plat form", based on his demand.

In embodiments of the present disclosure, searching for the application of the target application for opening the file to be opened is a procedure of searching for the fast application required for use.

In an alternative implementation, the application server stores and maintains an association relationship between applications and file formats, in which the association relationship is configured to describe which type of file can be opened by which application or applications. When searching for the application information of the target application for opening the file to be opened, on one hand, the electronic device first builds the application search request according to a preset message format, the application search request at least including the format information of the file to be opened, and then sends the built application search request to the application server to instruct the application server to search for the application information of the target application which can open the file to be opened, and receives the application information of the target application returned by the application server; and on the other hand, after receiving the application search request sent by the electronic device, the application server finds the application information of the target application which can open the file to be opened (the application information is configured to describe the target application) according to the stored association relationship between applications and file formats and the format information of the file to be opened parsed from the application search request (the format information is configured to describe the file format of the file to be opened, for example, is the extension), and then returns the found application information of the target application to the electronic device.

The application information may be an application identification of the target application. The application identification is a character or a character string which can be mapped to the target application. For example, the application identification may be an application name of the target application, a part of the application name, or other terms associated with the target application, etc.

For example, when the application server finds according to the application search request that the target application for opening the file to be opened is a certain PDF reader application, the application server returns the application name "reader XX" of the PDF reader application as the application information of the target application.

In another alternative implementation, the application server does not store and maintain the association relationship between applications and file formats. When searching for the application information of the target application for opening the file to be opened, on one hand, the electronic device first builds the application search request according to a preset message format, the application search request at least including the application information of the file to be opened, and then sends the built application search request to the application server to instruct the application server to search for the application information of the target application which can open the file to be opened, and receives the application information of the target application returned by the application server; and on the other hand, after receiving the application search request sent by the electronic device, the application server parses the application information carried by the application search request, builds a second application search request according to the application information, sends the built second application search request to a search server to instruct the search server to search for the application information of the target application which can open the file to be opened, and returns the application information of the target application to the electronic device after receiving the application information of the target application which can open the file to be opened returned by the search server.

It is to be noted that, in addition to being associated with the target application, the application information is also associated with the fast application corresponding to the target application. For example, the target application is a reader application A, and the application information "XX" is associated with both the reader application A and the fast application A corresponding to the reader application A.

At block 303, a configuration file obtaining request is sent to the application server according to the application information of the target application.

The configuration file obtaining request carrying the application information of the target application may be first sent to the application server, in which the configuration file obtaining request is configured to instruct the application server to return the configuration file corresponding to the target application.

The configuration file corresponding to the target application is the configuration file of the fast application corresponding to the target application. The configuration file is provided for the electronic device to generate and display a native interface of the target application, such that even if the application has not been installed, the electronic device may achieve an operation effect same as if the target application has been installed.

In detail, the configuration file includes a statement describing an interface of the target application. The statement includes data required for displaying the interface and run logic of the interface.

Such data may include display elements required to be displayed in the interface of the target application, layout information of the display elements, and resource addresses required for displaying the display elements, and the like. The layout information may include information such as positions, sizes and colors of respective display elements. The resource addresses may be addresses of local resources of the electronic device or link addresses of resources stored in the application server.

The foregoing run logic may include interface addresses jumped to when clicking the display elements, or operations required to execute for clicking the display elements, or operations required to execute for other user operations.

It is to be noted that, the foregoing data and run logic may be implemented based on JavaScript language.

At block 304, a configuration file corresponding to the target application returned by the application server according to the configuration file obtaining request is cached.

In embodiments of the present disclosure, after sending the configuration file obtaining request to the application server, the electronic device waits to receive the configuration file corresponding to the target application returned by the application server, and caches the configuration file into the preset cache region when receiving the configuration file corresponding to the target application returned by the application server. In embodiments of the present disclosure, the size and the path of the cache region is not limited, and may be set by those skilled in the art based on actual demand.

At block 305, an application entry of the target application is provided in a current interface according to the application information of the target application.

Different display forms of application entries may be provided according to different target applications. It is to be noted that, in embodiments of the present disclosure, the display form of the application entry is not limited, which may adopt the form of "widget", or the form of "shortcut".

For example, as illustrated in FIG. 4, file D is the file to be opened, the obtained application information describes that the target application is a reader application, the application entry of the reader application may be provided in the form of widget "read" and superimposed on the file icon of file D, and the user may click the displayed widget "read" with the finger to trigger the application entry.

At block 306, when the application entry of the target application is triggered, the cached configuration file corresponding to the target application is obtained.

In embodiments of the present disclosure, since the configuration file corresponding to the target application has been cached in the local cache region, the configuration file corresponding to the target application can be obtained from the cache region when the application entry of the target application is triggered.

At block 307, a native interface of the target application is generated according to the configuration file, and the file to be opened is uploaded to the application server, and file content of the file to be opened returned by the application server is received.

The electronic device calls the framework file built in the operating system according to the configuration file corresponding to the target application (i.e., the configuration file of the fast application corresponding to the target application), to parse the foregoing statement. The framework file would parse the statement in the configuration file into display elements, convert the parsed display elements into a native view of the target application according to a correspondence relationship between the display elements and the native view of the target application provided in the framework file, and perform local rendering according to the converted native view, to generate the interface of the fast application corresponding to the target application, i.e., the native interface of the target application.

In embodiments of the present disclosure, while the native interface is generated, or after the native interface is generated, the file to be opened is uploaded to the application server, to instruct the application server to return the file content obtained from opening the file to be opened. In detail, on one hand, the electronic device uploads the file to be opened to the application server, and waits to receive the file content returned by the application server, which is obtained by opening the file to be opened; on the other hand, after receiving the file to be opened uploaded by the electronic device, the application server parses the file to be opened with the file parsing service of the target application, and returns the parsed file content to the electronic device.

At block 309, the received file content is displayed in the native interface.

In embodiments of the present disclosure, after receiving the file content of the file to be opened returned by the application server, the received file content may be displayed in the native interface of the target application.

Figure 6:
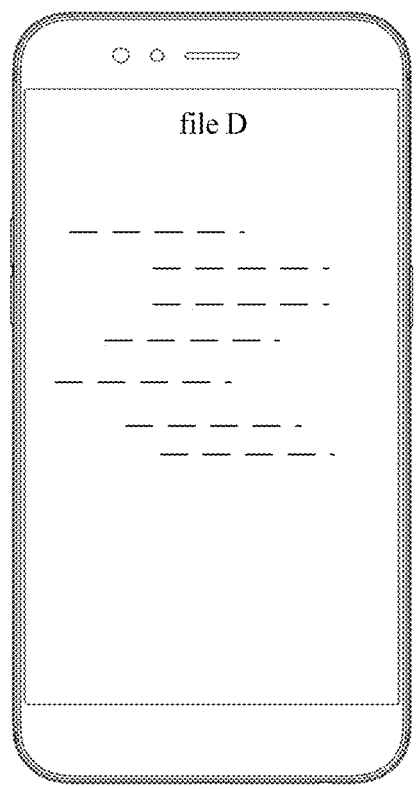
FIG. 6 is a schematic diagram illustrating an effect in which a file to be opened has been opened according to an embodiment of the present disclosure.

For example, as illustrated in FIG. 6, the electronic device displays the file content of the file to be opened "file D" in the generated native interface of the target application.

In conclusion, embodiments of the present disclosure receive the file opening request, obtain the format information of the file to be opened indicated by the file opening request, search for application information of the target application for opening the file to be opened according to the format information, provide the application entry of the target application in the current interface according to the application information, obtain the configuration file corresponding to the target application when the application entry is triggered, and generate the native interface of the target application according to the configuration file and open the file to be opened in the native interface. With the technical solutions of the present disclosure, the file to be opened can be opened quickly. Even if the file to be opened has an unknown format, it is not necessary to download and install an additional application, which reduces the difficulty of opening the file.

Figure 7:
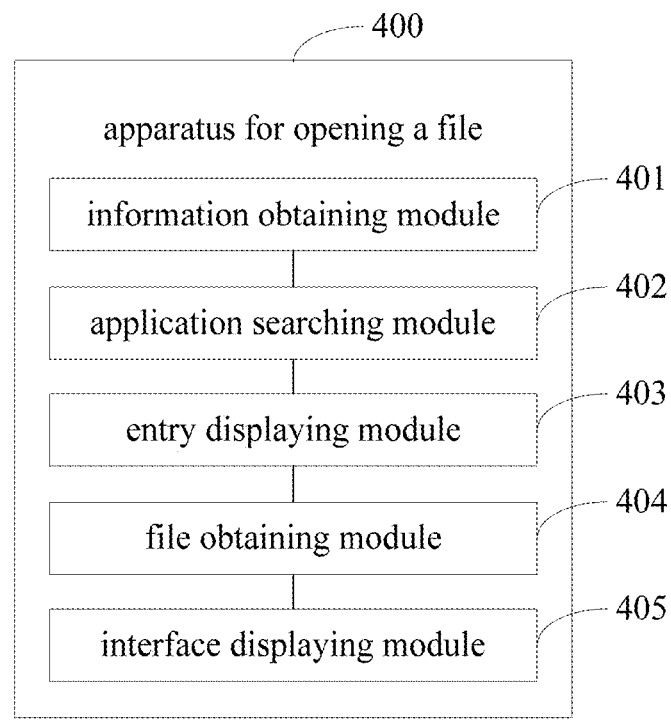
FIG. 7 is a block diagram of an apparatus for opening a file according to an embodiment of the present disclosure is applied.

In an embodiment, an apparatus for opening a file is provided. Please refer to FIG. 7, which is a block diagram of an apparatus 400 for opening a file according to an embodiment of the present disclosure. The apparatus 400 is applicable to an electronic device. The apparatus 400 includes an information obtaining module 401, an application searching module 402, an entry displaying module 403, a file obtaining module 404 and an interface displaying module 405.

The information obtaining module 401 is configured to receive a file opening request, and obtain format information of a file to be opened indicated by the file opening request.

The application searching module 402 is configured to search for application information of a target application for opening the file to be opened according to the format information.

The entry displaying module 403 is configured to provide an application entry of the target application in a current interface according to the application information.

The file obtaining module 404 is configured to obtain a configuration file corresponding to the target application when the application entry is triggered.

The interface displaying module 405 is configured to generate a native interface of the target application according to the configuration file and open the file to be opened in the native interface.

In an embodiment, the application searching module 402 is further configured to: send an application search request carrying the format information to an application server, in which the application search request is configured to instruct the application server to search for application information of the target application; and receive the application information of the target application returned by the application server.

In an embodiment, the apparatus 400 further includes a file caching module. The file caching module is configured to: send a configuration file obtaining request carrying the application information to the application server, in which the configuration file obtaining request is configured to instruct the application server to return the configuration file corresponding to the target application; and cache the configuration file corresponding to the target application returned by the application server. The file obtaining module 404 is further configured to obtain the cached configuration file corresponding to the target application when the application entry of the target application is triggered.

In an embodiment, the file caching module is further configured to delete the cached configuration file when the native interface of the target application is closed.

In an embodiment, the interface displaying module is further configured to: upload the file to be opened to the application server, to instruct the application server to return file content obtained by opening the file to be opened; receive the file content returned by the application server; and displaying the received file content in the native interface.

In an embodiment, the interface displaying module 405 is further configured to: enable a file parsing service of the target application according to the configuration file; parsing the file to be opened with the file parsing service, to obtain the file content of the file to be opened; and displaying the parsed file content in the native interface.

In an embodiment, the information obtaining module 401 is further configured to obtain storage path information of the file to be opened, and parse the storage path information to extract the format information of the file to be opened from the storage path information.

In specific implementation, above modules may be implemented as separate entities, or may be combined arbitrarily to be implemented as a single entity or several entities. Specific implementation of above modules may refer to foregoing embodiments, which will not be elaborated here.

In conclusion, with the apparatus 400 for opening the file according to this embodiment, the information obtaining module 401 receives the file opening request, and obtains the format information of the file to be opened indicated by the file opening request, the application searching module 402 searches for application information of the target application for opening the file to be opened according to the format information, the entry displaying module 403 provides the application entry of the target application in the current interface according to the application information, the file obtaining module 404 obtains the configuration file corresponding to the target application when the application entry is triggered, and the interface displaying module 405 generates the native interface of the target application according to the configuration file and opens the file to be opened in the native interface. With the technical solutions of the present disclosure, the file to be opened can be opened quickly. Even if the file to be opened has an unknown format, it is not necessary to download and install an additional application, which reduces the difficulty of opening the file.

Figure 8:
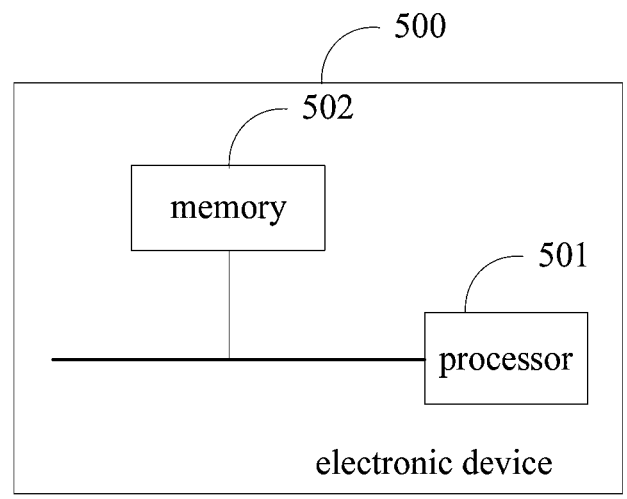
FIG. 8 is a block diagram of an electronic device according to an embodiment of the present disclosure.

Embodiments of the present disclosure further provide an electronic device. Referring to FIG. 8, the electronic device includes a processor 501 and a memory 502. The processor 501 is electrically connected with the memory 502.

The processor 500 is a control center of the electronic device 500, is connected with various parts of the electronic device via various interfaces and lines, and executes various functions of the electronic device 500 and processes data by running or loading computer programs stored in the memory 502 and calling the data stored in the memory 502, realizing automatic change of material information of the electronic device.

The memory 502 may be configured to store software programs and modules. The processor 501 executes various function applications and processes data by running the computer programs and modules stored in the memory 502. The memory 502 may mainly include a program storage region, and a data storage region. The program storage region may store the operating system, computer programs required by at least one functions (for example, a sound playback function, an image playback function, etc.), and the like. The data storage region may store data established according to usage of the electronic device. In addition, the memory 502 may include a high speed random access memory, or may include a non-volatile memory, for example at least one disk memory device, flash memory device, or other volatile solid storage devices. Accordingly, the memory 502 may further include a memory controller, for providing access of the processor 501 to the memory 502.

In embodiments of the present disclosure, the processor 501 in the electronic device 500 may load the instructions corresponding to one or more computer programs into the memory 502, and runs the computer programs stored in the memory 502 to realize various functions, as follows:

receiving a file opening request, and obtaining format information of a file to be opened indicated by the file opening request;

searching for application information of a target application for opening the file to be opened according to the format information;

providing an application entry of the target application in a current interface according to the application information;

obtaining a configuration file corresponding to the target application when the application entry is triggered; and generating a native interface of the target application according to the configuration file and opening the file to be opened in the native interface.

In some implementations, when searching for application information of the target application for opening the file to be opened according to the format information, the processor 501 may perform:

sending an application search request carrying the format information to an application server, wherein the application search request is configured to instruct the application server to search for the application information; and receiving the application information returned by the application server.

In some implementations, before obtaining the configuration file corresponding to the target application when the application entry is triggered, the processor 501 may further perform:

sending a configuration file obtaining request carrying the application information to the application server, wherein the configuration file obtaining request is configured to instruct the application server to return the configuration file corresponding to the target application; and caching the configuration file corresponding to the target application returned by the application server.

When obtaining the configuration file corresponding to the target application, the processor 501 may perform:

obtaining the cached configuration file when the application entry is triggered.

In some implementations, after opening the file to be opened in the native interface, the processor 501 may further perform: deleting the cached configuration file when the native interface is closed.

In some implementations, when opening the file to be opened in the native interface, the processor 501 may perform:

uploading the file to be opened to the application server, to instruct the application server to return file content obtained by opening the file to be opened;

receiving the file content returned by the application server; and displaying the file content in the native interface.

In some implementations, when opening the file to be opened in the native interface, the processor 501 may perform:

enabling a file parsing service of the target application according to the configuration file;

parsing the file to be opened with the file parsing service to obtain file content of the file to be opened; and displaying the file content in the native interface.

In some implementations, when obtaining format information of the file to be opened indicated by the file opening request, the processor 501 may perform:

obtaining storage path information of the file to be opened; and parsing the storage path information, to obtain the format information of the file to be opened from the storage path information.

In conclusion, embodiments of the present disclosure receive the file opening request, obtain the format information of the file to be opened indicated by the file opening request, search for application information of the target application for opening the file to be opened according to the format information, provide the application entry of the target application in the current interface according to the application information, obtain the configuration file corresponding to the target application when the application entry is triggered, and generate the native interface of the target application according to the configuration file and open the file to be opened in the native interface. With the technical solutions of the present disclosure, the file to be opened can be opened quickly. Even if the file to be opened has an unknown format, it is not necessary to download and install an additional application, which reduces the difficulty of opening the file.

Figure 9:
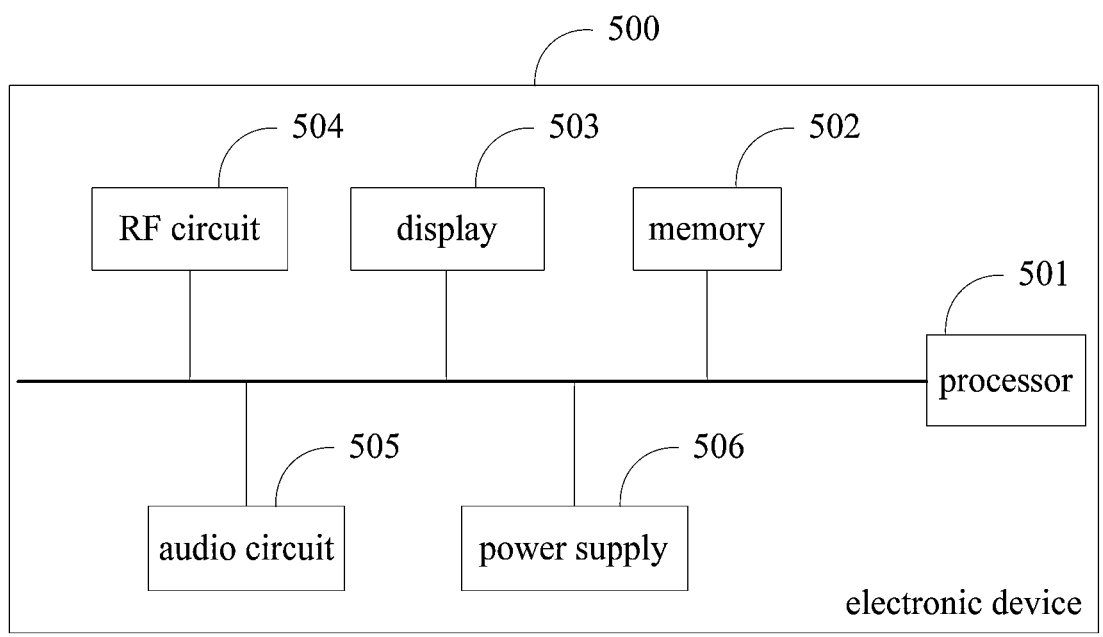
FIG. 9 is block diagram of an electronic device according to another embodiment of the present disclosure.

Referring to FIG. 9 together, in some implementations, the electronic device 500 may further include a display 503, a RF circuit 504, an audio circuit 505 and a power supply 506. The display 503, the RF circuit 504, the audio circuit 505 and the power supply are electrically connected with the processor 501.

The display 503 may be configured to display information input by the user or information provided to the user and various graphic user interfaces. These graphic user interfaces may consist of graphs, text, icons, videos and any combination thereof. The display 503 may include a display panel, which may be configured in a form of LCD (Liquid Crystal Display) or OLED (Organic Light-Emitting Diode) in some implementations.

The RF circuit 504 may be configured to transmit and receive RF signals, to establish wireless communication with a network device or other electronic devices, and transmit signals to and receive signals from the network device or other electronic devices.

The audio circuit 505 may be configured to provide an audio interface between the user and the electronic device via a speaker or a microphone.

The power supply 506 may be configured to supply power for respective parts of the electronic device 500. In some embodiments, the power supply 506 may be logically connected with the processor 501 via a power management system, such that functions such as charging and discharging management and power management may be realized through the power management system.

Although not shown in FIG. 9, the electronic device 500 may further include a camera, a Bluetooth module, and the like, which will not be elaborated here.

Embodiments of the present disclosure further provide a storage medium. The storage medium is stored with computer programs that, when running on a computer, cause the computer to perform the method for opening the file in any of above embodiments, for example: receiving a file opening request, and obtaining format information of a file to be opened indicated by the file opening request; searching for application information of a target application for opening the file to be opened according to the format information; providing an application entry of the target application in a current interface according to the application information; obtaining a configuration file corresponding to the target application when the application entry is triggered; and generating a native interface of the target application according to the configuration file and opening the file to be opened in the native interface.

In embodiments of the present disclosure, the storage medium may be a diskette, a CD, a RAM (Random Access Memory), a ROM (Read Only Memory), or the like.

Description of above embodiments focuses differently. For the part which is not described in detail in a certain embodiment, reference may be made to related description in other embodiments.

It is to be noted that, with respect to the method for opening the file according to embodiments of the present disclosure, those skilled in the art may understand that, all or a part of procedures of the method for opening the file according to embodiments of the present disclosure may be implemented by controlling related hardware through computer programs. The computer programs may be stored in a computer readable storage medium, for example, is stored in a memory of an electronic device, and is executed by at least one processor in the electronic device, the execution process of which may include the process of the method for opening the file. The storage medium may be a diskette, a CD, a ROM, a RAM and the like.

With respect to the apparatus for opening the file according to embodiments of the present disclosure, respective function modules may be integrated into one processing chip, or respective function modules may exist physically separately, or two or more modules may be integrated into one module. The integrated module may be implemented in a form of hardware, or may be implemented in a form of software function module. When the integrated module is implemented in the form of software function module, the integrated module may be sold or used as a separate product, or may be stored in a computer readable storage medium, which may be a ROM, a disk or a CD.

The method and apparatus for opening the file, the storage medium and the electronic device provided by embodiments of the present disclosure have been described in detail above. Specific examples have been adopted herein to explain the principle and implementations of the present disclosure. Above embodiments are merely illustrated to help understanding of the present method and the core idea thereof. Moreover, for those skilled in the art, specific implementations and application scope may vary based on the idea of the present disclosure. In conclusion, content of the specification should not be interpreted as limitation to the present disclosure.

What is claimed is:

1. A method for opening a file, comprising:

obtaining format information of a file based on a file opening request;

searching for application information for a target application based on the format information;

providing an application entry of the target application based on the application information;

obtaining a configuration file corresponding to the target application based on triggering the application entry;

obtaining a locally generated native interface of the target application based on the configuration file;

uploading the file to a remote application server, and instructing the remote application server to open the file and return file content;

receiving the file content returned by the remote application server; and displaying the file content returned by the remote application server in the locally generated native interface without installing the target application locally.

2. The method of claim 1, wherein obtaining the locally generated native interface comprises:
calling a framework file based on the configuration file to parse a statement included in the configuration file into display elements;
converting the display elements into a native view of the target application based on a correspondence relationship between the display elements and the native view; and
generating the native interface of the target application by performing local rendering based on the native view.

3. The method of claim 1, wherein searching for the application information comprises:
sending an application search request carrying the format information to the remote application server; and
receiving the application information returned by the remote application server.

4. The method of claim 1, further comprising:
sending a request for obtaining a configuration file to the remote application server, the request for obtaining the configuration file carrying the application information;
caching the configuration file corresponding to the target application returned by the remote application server; and
obtaining the cached configuration file based on triggering the application entry.

5. The method of claim 4, further comprising:
deleting the cached configuration file based on closing the native interface.

6. The method of claim 1, further comprising:
enabling a file parsing service of the target application based on the configuration file;
parsing the file with the file parsing service to obtain file content of the file; and
displaying the file content in the native interface without installing the target application locally.

7. The method of claim 1, wherein obtaining the format information of the file comprises:
obtaining storage path information of the file; and
obtaining the format information by parsing the storage path information.

8. The method of claim 1, further comprising:
determining whether there is an installed default application associated with the format information before searching for the application information, and
in a case where there is no installed default application, searching for the application information for the target application based on the format information.

9. The method of claim 1, wherein the application entry is displayed in a form of widget, or in a form of shortcut.

10. An electronic device, comprising:
a processor, and
a memory, configured to store computer programs, wherein the processor is configured to:
obtain format information of a file based on a file opening request;
search for application information for a target application based on the format information;
provide an application entry of the target application based on the application information;
obtain a configuration file corresponding to the target application based on triggering the application entry;
obtain a locally generated native interface of the target application based on the configuration file;
upload the file to a remote application server, and instruct the remote application server to open the file and return file content;
receive the file content returned by the remote application server; and
display the file content returned by the remote application server in the locally generated native interface without installing the target application locally.

11. The electronic device of claim 10, wherein the processor is further configured to:
call a framework file based on the configuration file to parse a statement included in the configuration file into display elements;
convert the display elements into a native view of the target application based on a correspondence relationship between the display elements and the native view; and
generate the native interface of the target application by performing local rendering based on the native view.

12. The electronic device of claim 10, wherein the processor is further configured to:
send an application search request carrying the format information to the remote application server; and
receive the application information returned by the remote application server.

13. The electronic device of claim 10, wherein the processor is further configured to:
send a request for obtaining a configuration file to the remote application server, the request for obtaining the configuration file carrying the application information;
cache the configuration file corresponding to the target application returned by the remote application server; and
obtain the cached configuration file based on triggering the application entry.

14. The electronic device of claim 13, wherein the processor is further configured to:
delete the cached configuration file based on closing the native interface is closed.

15. The electronic device of claim 10, wherein the processor is further configured to:
enable a file parsing service of the target application based on the configuration file;
parse the file with the file parsing service to obtain file content of the file; and
display the file content in the native interface without installing the target application locally.

16. The electronic device of claim 10, wherein the processor is further configured to:
obtain storage path information of the file; and
obtain the format information by parsing the storage path information.

17. The electronic device of claim 10, wherein the processor is further configured to:
determine whether there is an installed default application associated with the format information before searching for the application information, and
in a case where there is no installed default application, search for the application information for the target application based on the format information.

18. The electronic device of claim 10, wherein the application entry is displayed in a form of widget, or in a form of shortcut.

19. The electronic device of claim 10, wherein the electronic device comprises at least one of a smart phone, a tablet computer, a personal digital assistant and a wearable device.

20. A non-transitory computer-readable storage medium, having instructions stored thereon, wherein when the instructions are executed by a processor, the processor is caused to execute a method for opening a file, the method comprising:
- obtaining format information of a file based on a file opening request;
- searching for application information for a target application based on the format information;
- providing an application entry of the target application in a current interface based on the application information;
- obtaining a configuration file corresponding to the target application based on triggering the application entry;
- obtaining a locally generated native interface of the target application based on the configuration file;
- uploading the file to a remote application server, and instructing the remote application server to open the file and return file content;
- receiving the file content returned by the remote application server; and
- displaying the file content returned by the remote application server in the locally generated native interface without installing the target application locally.

* * * * *